(12) United States Patent
Lee et al.

(10) Patent No.: US 7,480,004 B2
(45) Date of Patent: Jan. 20, 2009

(54) TWO-STEP AUTO FOCUS LENS SYSTEM

(75) Inventors: Yi-Ming Lee, Taipei (TW); Wei-Kuo Shih, Taipei Hsien (TW)

(73) Assignee: Lite-on Technology Corporation, Taipei (TW)

( * ) Notice: Subject to any disclaimer, the term of this patent is extended or adjusted under 35 U.S.C. 154(b) by 726 days.

(21) Appl. No.: 10/953,853

(22) Filed: Sep. 29, 2004

(65) Prior Publication Data

US 2006/0066746 A1    Mar. 30, 2006

(51) Int. Cl.
*G03B 13/00* (2006.01)
*H04N 5/228* (2006.01)

(52) U.S. Cl. .................. 348/357; 348/345; 348/208.11; 348/208.12

(58) Field of Classification Search ................ 348/357, 348/345, 208.11, 208.12; 359/699, 704; 396/85, 139, 133
See application file for complete search history.

(56) References Cited

U.S. PATENT DOCUMENTS

| | | | | |
|---|---|---|---|---|
| 5,241,422 A | * | 8/1993 | Shimada et al. | 359/694 |
| 5,555,623 A | * | 9/1996 | Goda | 29/896.9 |
| 6,704,505 B1 | * | 3/2004 | Hung | 396/85 |
| 7,158,316 B2 | * | 1/2007 | Chang et al. | 359/698 |
| 2004/0174614 A1 | * | 9/2004 | Hovanky | 359/694 |
| 2006/0202566 A1 | * | 9/2006 | Osaka | 310/12 |
| 2007/0116451 A1 | * | 5/2007 | Yamamoto et al. | 396/133 |
| 2007/0223903 A1 | * | 9/2007 | Ho et al. | 396/85 |
| 2008/0063390 A1 | * | 3/2008 | Hsiao et al. | 396/133 |

* cited by examiner

*Primary Examiner*—Lin Ye
*Assistant Examiner*—Marly Camargo
(74) *Attorney, Agent, or Firm*—Rosenberg, Klein & Lee

(57) ABSTRACT

A two-step auto focus lens system for a digital camera so that the digital camera can switch between a near focal point and a far focal point. The two-step auto focus lens system includes a coil base, a sensor, and a lens barrel. The coil base has two ends and a coil around the coil base. The sensor is disposed corresponding to one end of the coil base to drives the coil base to switch polarities of the two ends of the coil base. The lens barrel is movably installed inside the coil base and has a magnetic component corresponding to the other end of the coil base. When the coil base is driven by the sensor to switch polarities of ends of coil base, lens barrel moves relative to the coil base to the near and far focal points.

3 Claims, 4 Drawing Sheets

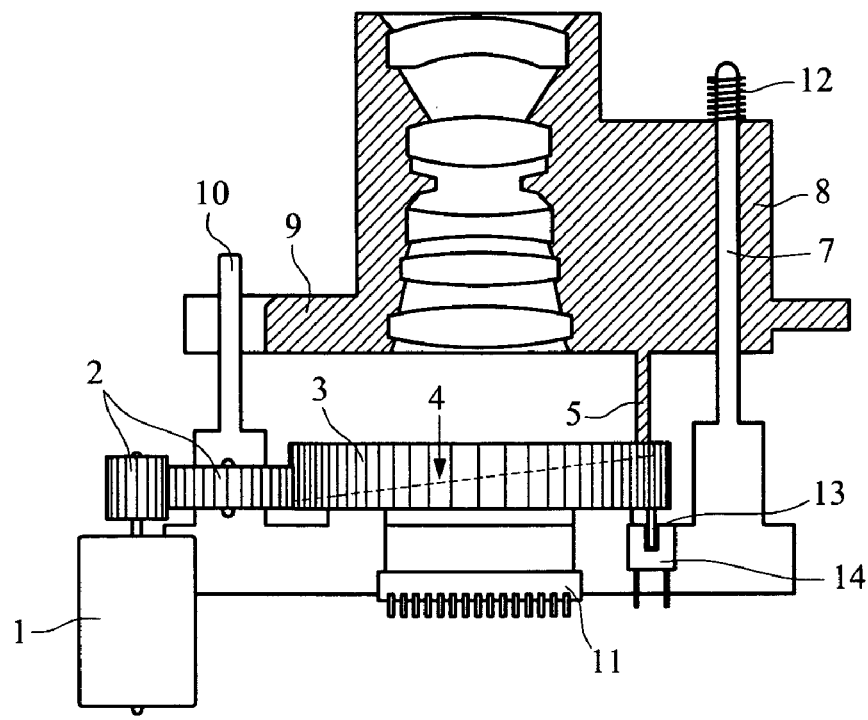
FIG. 1 ((PRIOR ART)
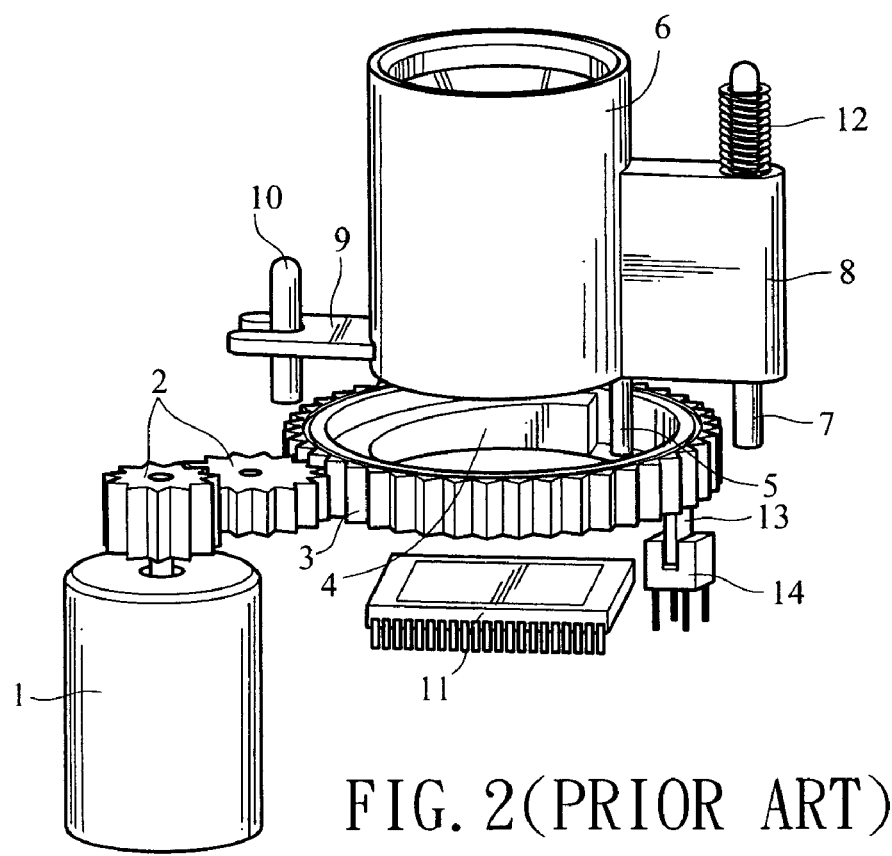
FIG. 2(PRIOR ART)

TWO-STEP AUTO FOCUS LENS SYSTEM

BACKGROUND OF THE INVENTION

1. Field of Invention

The invention relates to a lens for digital cameras and, in particular, to a two-step auto focus lens system.

2. Related Art

There are many ways to help people memorize happy times. Taking pictures is one of the most frequent ways. Therefore, one often needs to use a camera for recording the memorable moments. As we can see, the designs of cameras have evolved toward compact styles, so have the currently popular digital cameras.

The focus structure of digital cameras can be roughly divided into a manual focus structure and an auto focus structure. The manual focus structure allows one to focus the lens to a desired position, whereas the auto focus structure focuses on an object by comparing with the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by an annular can, The annular cam is provided with a lens driving structure and driven to rotate by a stepping motor. At the moment when the CPU detects a clearest image as the lens moves back and forth, a stop signal is simultaneously sent to the lens. Therefore, the lens stops at the best focal position (static position). When the lens is to be moved back to the original position, the annular cam starts to rotate again. Once the lens moves back to its original position, the photo interrupter installed by the lens cylinder uses the shutter at the end of the lens cylinder, to detect the original position of the lens. The shutter will interrupt the light of the penetration-type photo interrupter. The lens stops at the moment when the photo interrupter detects the original position.

Consequently, the lens in a digital camera auto focus system has to be driven continuously, so is the image detection. Every time an image is captured, the lens has to return to its original position. Thus, the lens focusing procedure is very time-consuming, which, in most of cases, results in losing the best image-capturing time. Moreover, the structure including a stepping motor, an annular cam, and a photo interrupter is very expensive.

With reference to the cross-sectional view of a traditional digital camera auto focus structure in FIG. 1 and the corresponding three-dimensional view in FIG. 2, when the stepping motor 1 receives a start signal from the digital camera CPU, it starts to rotate. A stepping motor gear 2 that matches with an annular cam gear 3 provided at the border of the annular cam 4 also rotates. The annular cam 4 thus starts to rotate because of the stepping motor gear 2 and the annular cam gear 3. A position-detecting rod 5 moves back and forth (up and down) along the slope surface of the annular cam 4. The whole lens module 6 moves back and forth along a track 7. One side of the lens cylinder is provided with a sheath, where the position-detecting rod 5 is installed as one part and protrudes from the sheath. The outermost part of the sheath of the lens module 6 is provided with a bearing 8 moving back and forth along the track 7. The other side of the lens is provided with a position-fixing fork 9 as one part of the lens cylinder. A position-fixing pin 10 is provided between the two terminals of the position-fixing fork 9.

The bearing 8, the track 7, the position-fixing fork 9 and the position-fixing pin 10 support the lens module 6. The lens module 6 is always pressed toward an image sensor 11 by a coil spring 12, so that the tip of the position-detecting rod 5 always appropriately touches the slant surface of the annular cam 4.

When the power of the digital camera is turned on, the image is formed on the image sensor 11 by the lens module 6. Once the switch of the auto focus structure is turned on, the image focusing is transmitted to the CPU in a continuous way for checking the image formed on the image sensor 11. When the image becomes clearest, the CPU sends out a stop-checking signal, and the stop-checking signal stops the stepping motor 1, releases the shutter, and captures the image. After these steps, the lens module 6 has to return to its original position (static position). A shutter-detecting blade 13 is provided at the edge of the annular cam 4. After capturing the image, the annular cam 4 starts to rotate again to bring the lens module 6 back to its original position. When the shutter-detecting blade 13 enters the slit of the photo interrupter 14, the beam in the photo interrupter 14 is interrupted by the shutter-detecting blade 13. The annular cam 4 immediately stops here so that the lens module 6 can return and stop at its original position. As shown in FIG. 2, the lens module is right at its original position.

The lens module 6 has to move back and forth for the CPU to check the image. This method of searching for an optimal focal point makes use of mechanical and continuous lens motion to repeatedly check the image. Thus, it is time-consuming so that the user may miss the best timing. Moreover, this complicated structure has to be finely assembled and adjusted. Its components are often very expensive. Therefore, it would be desirable to provide a simple structure that uses fewer cheap components while saving focusing time, electric power, and the required space.

SUMMARY OF THE INVENTION

An object of the invention is to provide a two-step focus lens that utilizes a simple structure composed of fewer, cheaper components and saves focusing time.

The disclosed two-step auto focus lens system is used in a digital camera so that the digital camera can switch between a near focal point and a far focal point. The lens system includes a coil base, a sensor, and a lens barrel. The coil base has two ends and a coil round the coil base. The sensor is disposed corresponding to one end of the coil base and drives the coil base to switch its two polarities according to the winding direction of the coil on the coil base. The lens barrel is movably installed inside the coil base and has a magnetic component corresponding to the other end of the coil base. When the coil base is driven by the sensor to switch its polarities, the lens barrel moves relative to the coil base to the near and far focal points alternatively.

Hereinafter describes the situation of the lens system of the digital camera switching from its near focal point to the far focal point. The magnetism of the magnetic component on the lens barrel near the coil base is the same as that of the far end of the coil base from the sensor when the lens system is at its near focal point position. A repelling force between the magnetic component and the coil base is induced. After the sensor drives the coil base to switch the magnetic polarities of the coil base, the magnetism of the magnetic component near the coil base is different from that of the far end of coil base from the sensor. An attractive force between the magnetic component and the coil base is induced. Consequently, the lens system moves to its far focal point, and vice versa.

BRIEF DESCRIPTION OF THE DRAWINGS

The invention will become more fully understood from the detailed description given herein below illustration only, and thus are not limitative of the present invention, and wherein:

FIG. 1 is a cross-sectional view of the auto focus structure in a conventional digital camera;

FIG. 2 is a three-dimensional view of the auto focus structure in a conventional digital camera;

DETAILED DESCRIPTION OF THE INVENTION

Figure 3:
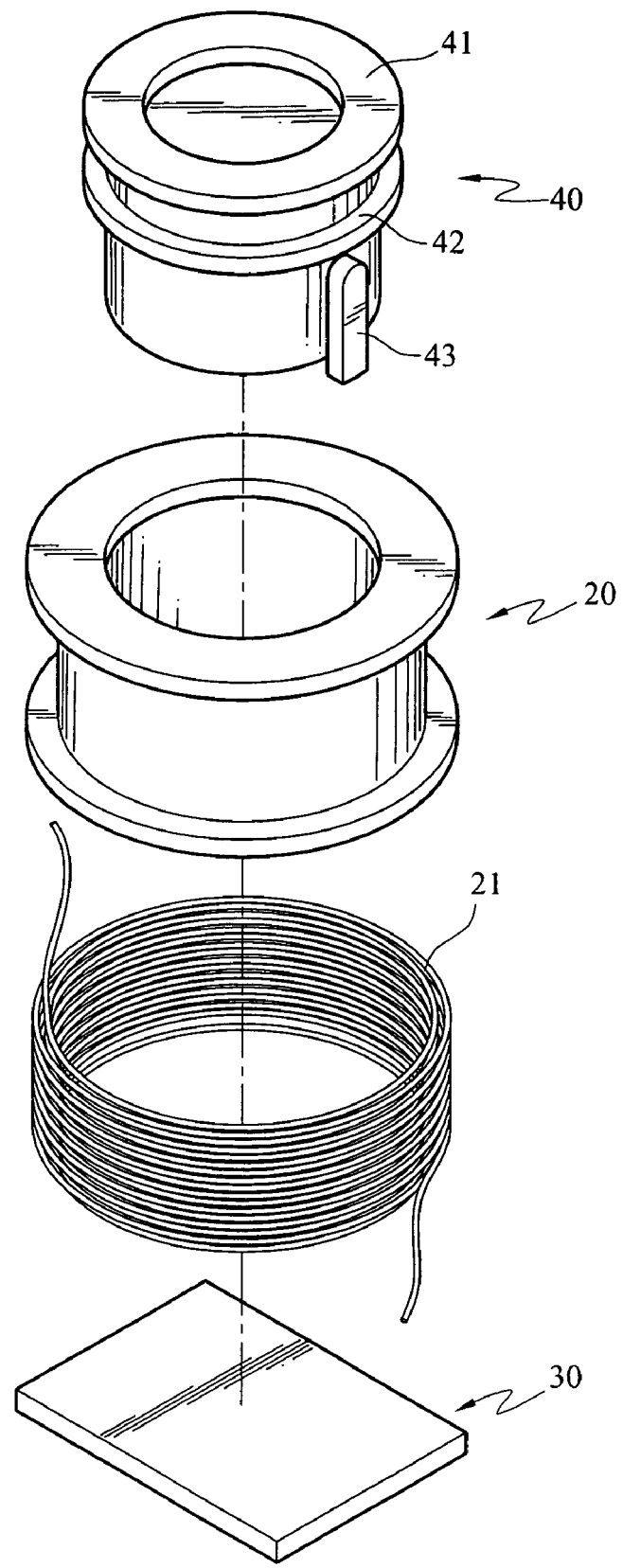
FIG. 3 shows an exploded view of the disclosed two-step auto focus lens system.
Figure 4:
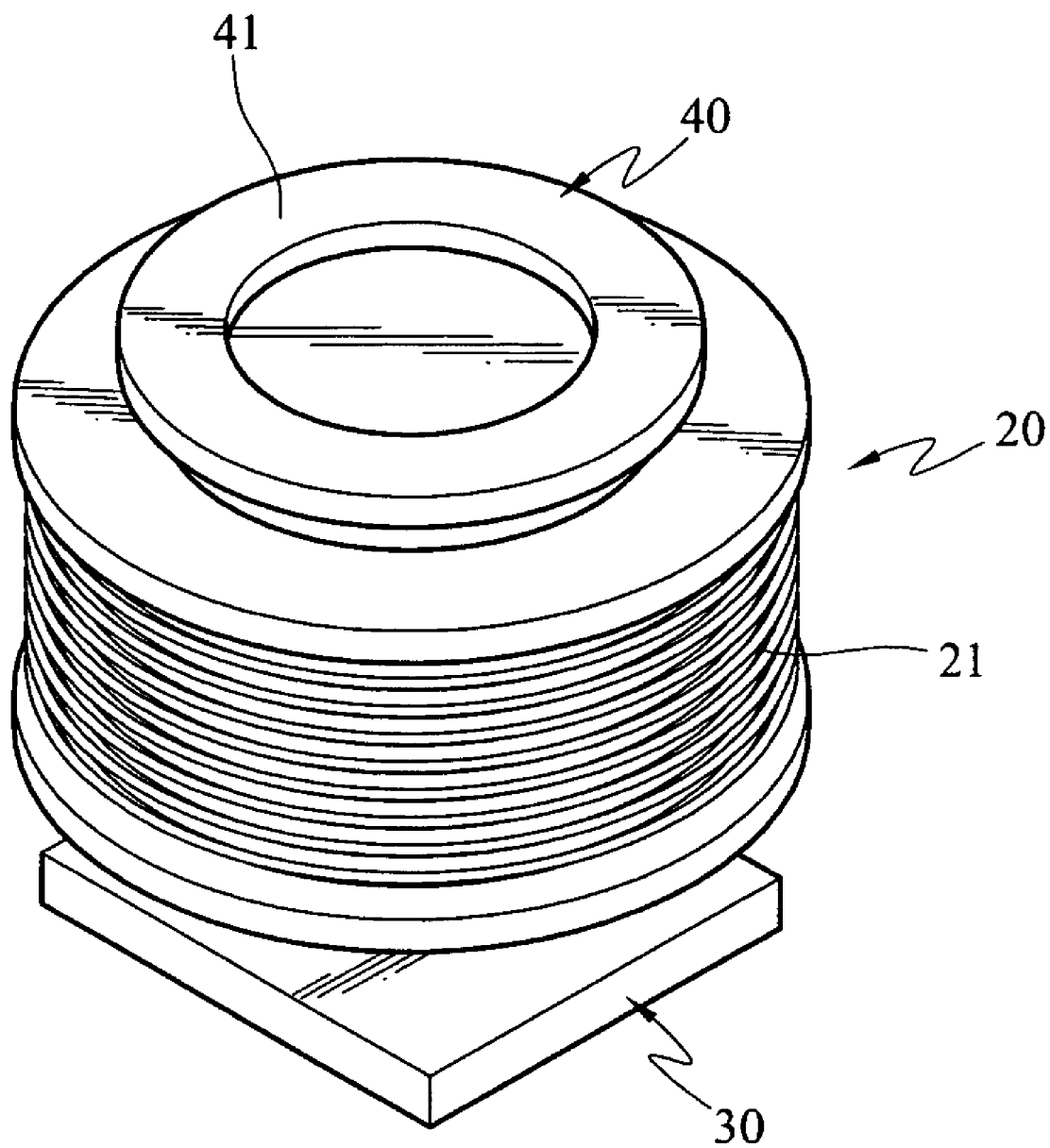
FIG. 4 shows an assembly diagram of the disclosed two-step auto focus lens system.
Figure 5A:
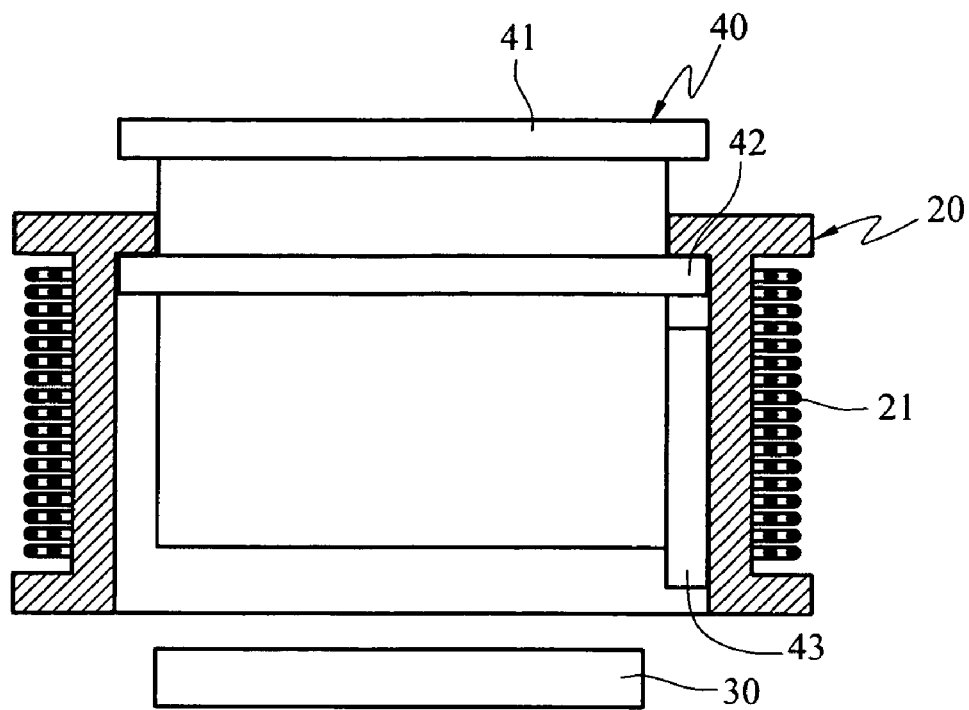
FIGS. 5A and 5B are cross-sectional views of the disclosed two-step auto focus lens system in its near and far focal points, respectively.

FIG. 3 shows an exploded view of the disclosed two-step auto focus lens system. FIG. 4 shows an assembly diagram of the disclosed two-step auto focus lens system. FIGS. 5A and 58 are cross-sectional views of the disclosed two-step auto focus lens system in its near and far focal points, respectively. The lens system is used in a digital camera so that it can switch between its near and far focal points. The lens system contains a coil base 20, a sensor 30, and a lens barrel 40. The coil base 20 has two ends and a coil 21 around the coil base. The sensor 30 is disposed corresponding to one end of the coil base to drives the coil base 20 to switch its two polarities according to the winding direction of the coil 21 on the coil base 20. The lens barrel 40 is movably installed inside the coil base 20 and corresponds to the sensor 30. The end of the lens barrel 40 has a magnetic component 41 corresponding to the other end of the coil base 40. The lens barrel 40 further has a stopper 42 and an arm 43. The stopper 42 is disposed on a surface of the lens barrel corresponding to the inner rim of the coil base 20. The lens barrel 40 moves relative to the coil base 20 to reach the near and far focal points as the coil base 20 switches the polarities on its two ends. That is, the stopper 42 contacts against the inner rim of the coil base 20 as the lens barrel 40 reaches the near focal point, and the magnetic component 41 contacts against the coil base 20 as the lens barrel 40 reaches the far focal point.

Figure 5B:
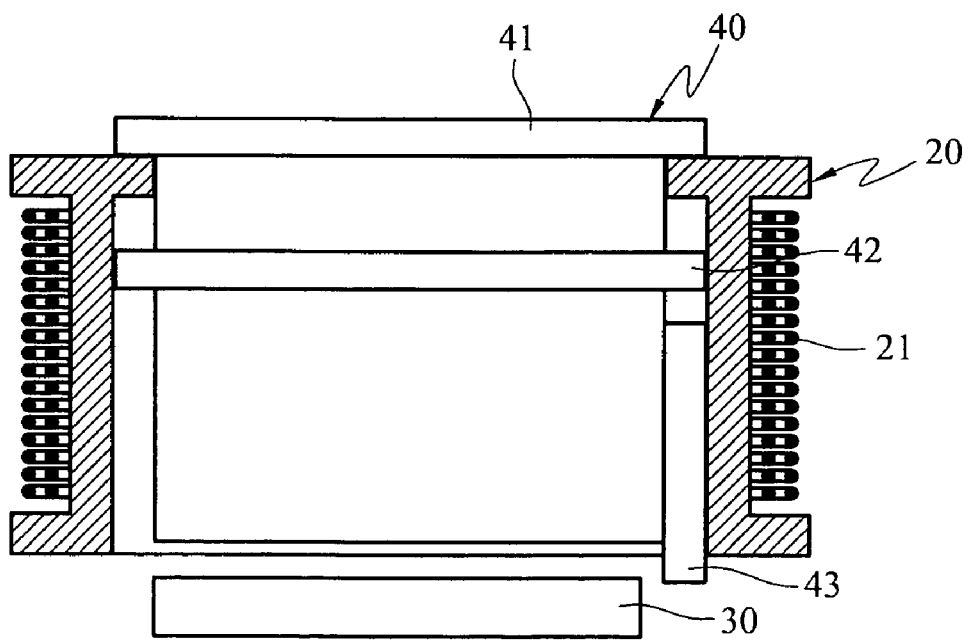

Please refer to FIGS. 5A and 5B for the situation when the lens system of the digital camera switches from its near focal point to its far focal point. When the lens system is at its near focal point, the magnetism of the magnetic component 41 on the lens barrel 40 near the coil base 20 is the same as that of the far end of coil base 20 from the sensor 30. A magnetic repelling force between the magnetic component 41 and the coil base 20 is induced by the sensor 30. After the coil base is driven by the sensor 30 to switches the magnetic polarities of the coil base 20, the magnetism of the magnetic component 41 near the coil base 20 is different from that of the far end of coil base 20 from the sensor 30. Thus, a magnetic attractive force between the magnetic component 41 and the coil base 20 is induced. Consequently, the lens system moves to its far focal point.

Since the arm 43 can provide a friction between the arm 43 and the inner surface of the coil base 20, no electric power is needed after the sensor 30 moves the lens barrel 40 to the near or far focal point. The arm 43 directly produces the necessary friction between the lens barrel 40 and the inner surface of the coil base 20. So the friction fixes the lens barrel 40 at its near or far focal point.

Please further refer to FIGS. 5A and 5B for the situation when the lens system of the digital camera switches from its distant far focal point to its near focal point. When the lens is at its far focal point, the magnetism of the magnetic component 41 on the lens barrel 40 near the coil base 20 is different from that of the distant end of coil base 20 from the sensor 30. An attractive force between the magnetic component 41 and the coil base 20 is induced. After the sensor 30 switches the magnetic polarities of the coil base 20, the magnetism of the magnetic component 41 near the coil base 20 is the same as that of the far end of coil base 20 from the sensor 30. A repelling force between the magnetic component 41 and the coil base 20 is induced. Consequently, the lens system moves to its near focal point.

Based upon the above description, one sees that the invention uses a very simple structure that involves fewer inexpensive components to achieve the goal of short focusing time.

Certain variations would be apparent to those skilled in the art, which variations are considered within the spirit and scope of the claimed invention.

What is claimed is:

1. A two-step auto focus lens system for a digital camera, comprising:
   a coil base, having two ends and a coil, the coil being around the coil base and between the two ends;
   a sensor, disposed corresponding to one end of the coil base; and the electrical current on the coil driving the coil base to switch magnetic polarities of the two ends of the coil base; and
   a lens barrel, movably installed inside the coil base and having a magnetic component corresponding to the other end of the coil base, wherein the lens barrel has an arm in contact with the inner surface of the coil base to produce friction between the arm and the coil base;
   wherein the lens barrel is alternately moved between a near focal point and a far focal point, by magnetic repulsion and magnetic attraction respectively between the magnetic component and the coil base when the coil base is driven by the sensor to switch the magnetic polarities of the two ends of the coil base and the lens barrel is positioned at the near focal point or the far focal point by the friction.

2. The two-step auto focus lens system of claim 1, wherein the magnetic component contacts against the other end of the coil base as the lens barrel reaches the far focal point.

3. The two-step auto focus lens system of claim 2, wherein the lens barrel has a stopper disposed on a surface of the lens barrel corresponding to an inner rim of the coil base, and the stopper contacts against the inner rim as the lens barrel reaches the near focal point.

* * * * *